United States Patent [19]
Enomoto et al.

[11] Patent Number: 5,126,834
[45] Date of Patent: Jun. 30, 1992

[54] COLOR IMAGE PROCESSING SYSTEM WITH HUE PROCESSING AND MODIFICATION

[75] Inventors: Hajime Enomoto, Funabashi; Isao Miyamura, Niigata, both of Japan

[73] Assignee: Fujitsu Limited, Kawasaki, Japan

[21] Appl. No.: 477,550

[22] Filed: Feb. 9, 1990

[30] Foreign Application Priority Data

Feb. 9, 1989 [JP] Japan ................................. 1-30859

[51] Int. Cl.$^5$ ............................................. H04N 11/04
[52] U.S. Cl. ............................................................ 358/28
[58] Field of Search ..................... 358/12, 13, 21 R, 28

[56] References Cited

U.S. PATENT DOCUMENTS 4,974,071 11/1990 Maeda ................................. 358/13

FOREIGN PATENT DOCUMENTS 0293225 7/1984 European Pat. Off. .

OTHER PUBLICATIONS

D. Darba et al.: "Separation du signal d'image couleur en deux composantes", *Reconnaissance des Formes et Intelligence Artificielle*, 4eme Congres, Paris, Jan. 25-27, 1984, vol. 1, pp. 15-24.
Patent Abstracts of Japan, vol. 12, No. 414, Nov. 2, 1988; & JP-A-63 151 268 (Matsushita Electric Ind. Co., Ltd), Jun. 23, 1988.

*Primary Examiner*—Tommy P. Chin
*Attorney, Agent, or Firm*—Staas & Halsey

[57] ABSTRACT

A color picture image processing system for effecting hue processing and hue modification based on a derivation of chrominance components. A contour line determination unit determines a contour line in response to picture information and possibly sketch drawing information. A contour line chrominance providing unit determines a plurality of main points on the contour line and determines a chrominance main point vectors for the main points to provide chrominance contour vectors. The system includes a window unit for holding a new window setting resulting from processing a modification, a contour line modification unit for supplying instructions for modification of the contour line determined by the contour line determination unit and a contour line inner range chrominance processing unit for providing chrominance inner range vectors inside a range defined by the contour line. Synthesis processing of chrominances of picture elements constituting an instructed color picture this carried out, based on an information obtained from vectors representing a lamellar and vortex component parts of the chrominance component of the picture information.

16 Claims, 13 Drawing Sheets

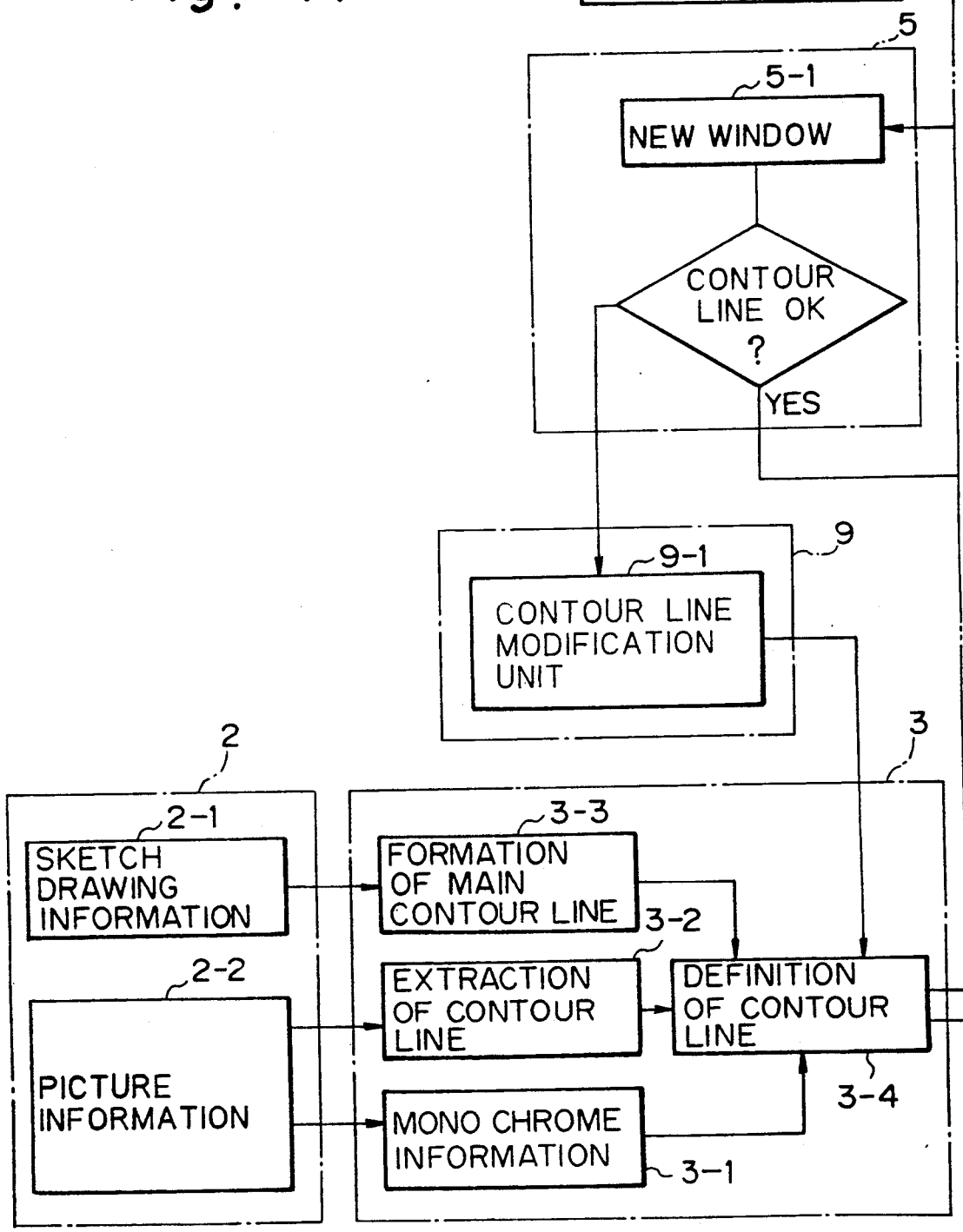

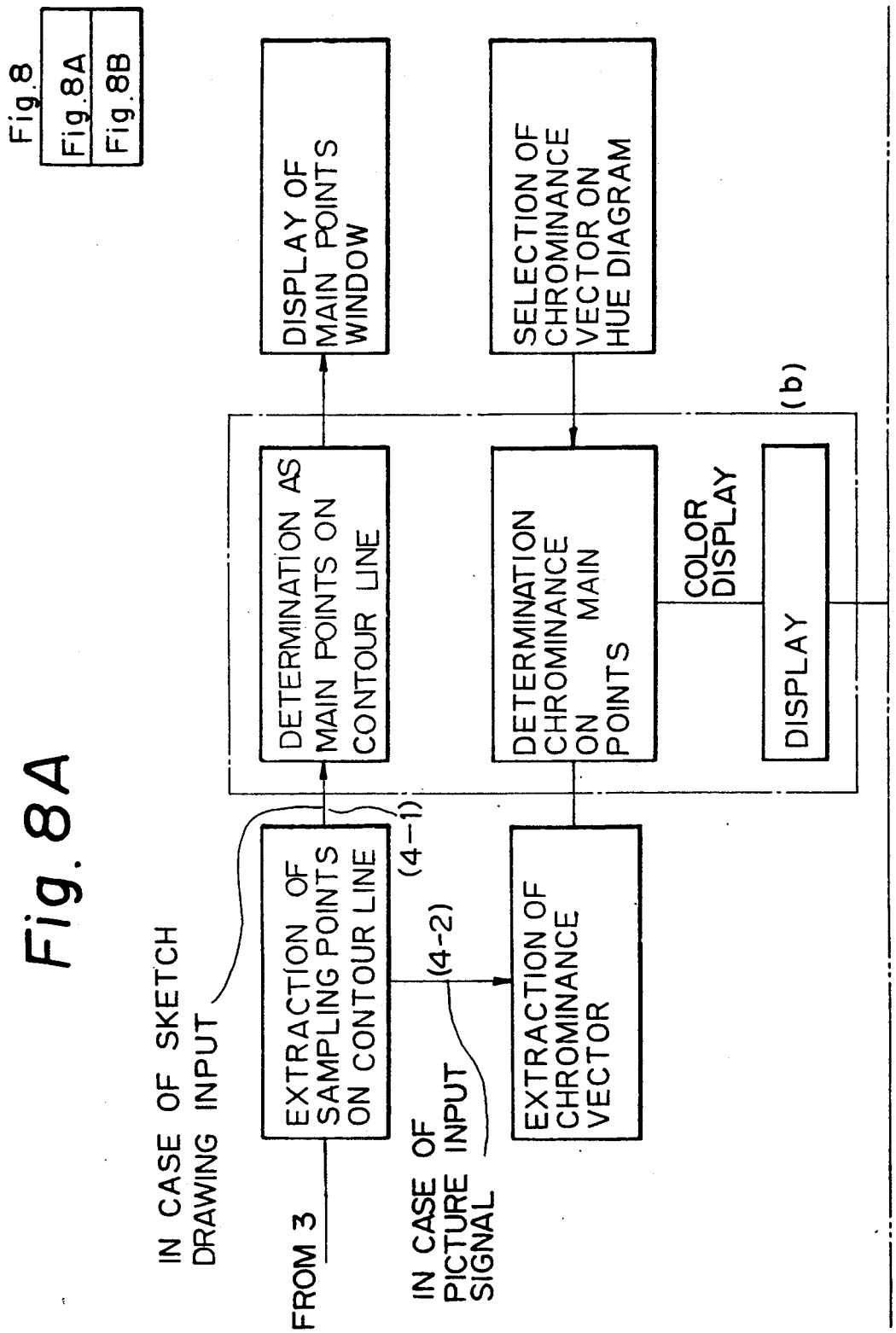

COLOR IMAGE PROCESSING SYSTEM WITH HUE PROCESSING AND MODIFICATION

BACKGROUND OF THE INVENTION

1. Field of the Invention

The present invention relates to a color picture image processing system. The system according to the present invention is used for effecting hue processing and hue modification based on a separation of a chrominance component of a picture information, processing a contour line in response to an input picture information, and displaying the chrominance component.

2. Description of the Related Art

In a prior art color picture reproduction system, for example, a color picture reproduction workstation, it is sufficient to effect a comparatively simplified processing when a monochromatic color only is applied to a contour line. However, when a faithful reproduction of varying hues of color tint such as in a painting is desired, it is necessary to provide a tremendous amount of information in such a way that chrominance information is provided for each picture element.

An object of the present invention is to provide a color picture image processing system in which, based on a chrominance synthesis information obtained by a separation of a chrominance component of a picture image into a lamellar component and a vortex component, it is possible to synthesize the chrominance component of each picture element constituting a picture image and realize a faithful color reproduction.

Reference can be made to Japanese Patent Application Nos. 62-133690 and 63-39284, corresponding to U.S. Pat. No. 4,908,698, designating the same inventors as the present application and assigned to the same assignee as the present invention. These applications are directed to providing a color picture synthesis technique in which, in a color picture transmission, a chrominance component in a given picture is separated into a lamellar component and a vortex component for transmission, and a synthesis of the color picture in combination with a luminance component in the above given picture is effected. This technique can be utilized in the present invention.

SUMMARY OF THE INVENTION

In accordance with the present invention, there is provided a color picture image processing system for effecting hue processing and hue modification based on the separation of a chrominance component of a picture image into a lamellar component and a vortex component, the system including: an input means for inputting and outputting picture information; contour line determination means for determining a contour line in response to picture information input from the input means; contour line chrominance providing means for determining, from the contour line determined by the edge determination means, a plurality of main points on the contour line, and determining a newly instructed chrominance vector in the main points and providing a newly instructed chrominance from an entire contour line data, based on the value of the chrominance vector; window means for holding a new window setting resulting from a modification processing by a contour line modification portion, contour line modification means for giving instructions for a modification of a contour line to the contour line determination means, based on the chrominance information of the edge obtained by the contour line chrominance providing means; and contour line inside range chrominance means for providing a newly instructed chrominance in a range defined by the contour line, based on the chrominance information of the contour line obtained by the contour line chrominance providing means; a synthesis processing of chrominances of picture elements constituting an instructed color picture being carried out, based on an information obtained from a lamellar component part and a vortex component part of the chrominance component of the picture information.

BRIEF DESCRIPTION OF THE DRAWINGS

In the drawings:

FIGS. 5A and 5B are detailed block diagrams of the system of FIG. 1;

FIGS. 8A and 8B show a flow chart showing the function of the contour line chrominance provision portion;

DESCRIPTION OF THE PREFERRED EMBODIMENTS

Figure 1:
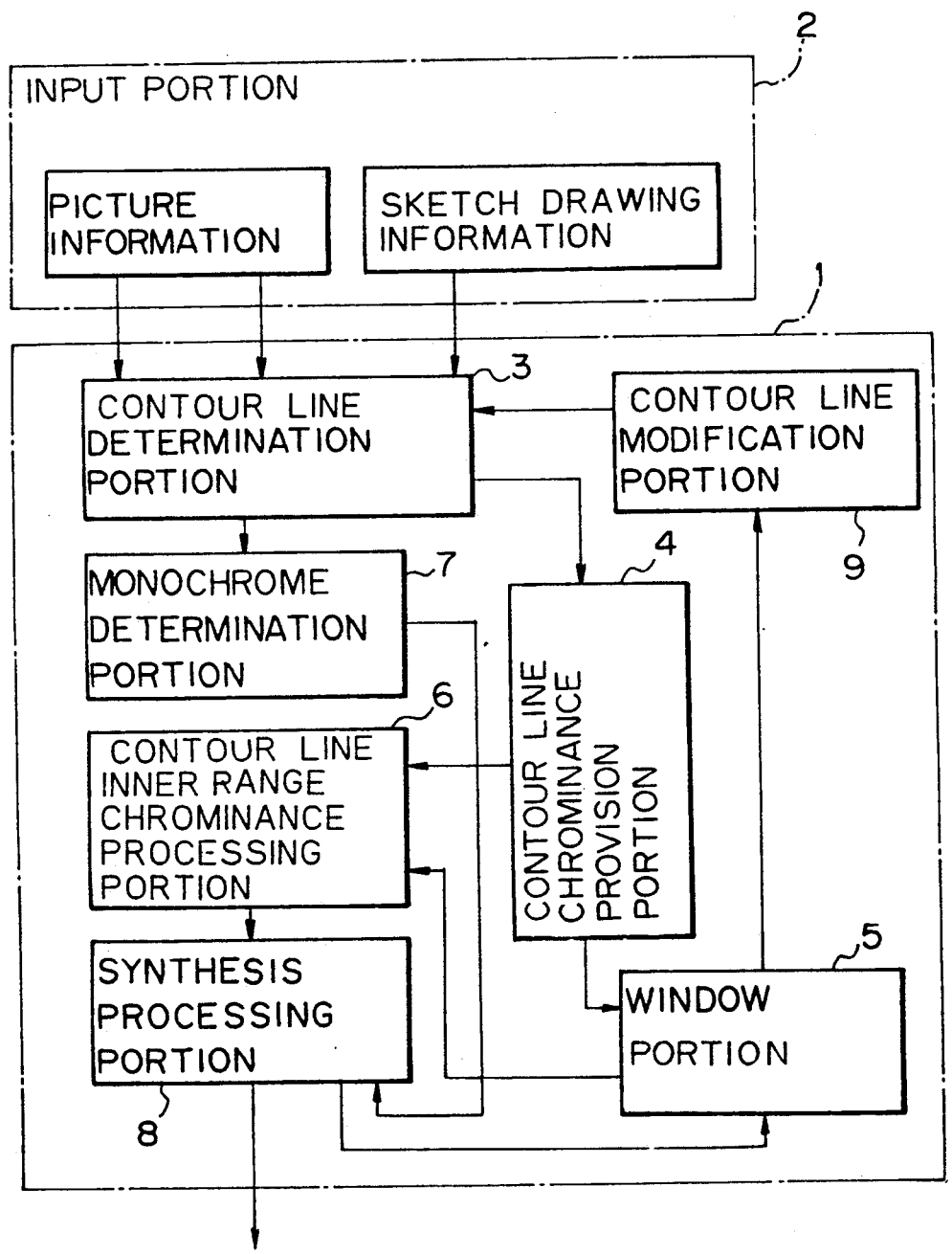
FIG. 1 is a block diagram showing an embodiment in accordance with the present invention.

FIG. 1 is a block diagram showing an embodiment in accordance with the present invention wherein information processing device 1 connects to input portion 2.

Contour line determination portion 3 determines based on picture information corresponding to a given picture, a contour line of the picture corresponding to the picture information.

The contour line is determined, based on a contour line obtained from the luminance component of the picture image and a contour line obtained by the use of the above-described lamellar and vortex components (that is, the contour line obtained by the use of the chrominance component). Of course, it is allowed that the contour line may be modified by a desired new design or layout, so it may be considered to be a provisional decision.

Contour line chrominance providing portion 4 selects a plurality of main points on the contour line determined by the contour line determination portion 3. From a result that a hue diagram is utilized to determine a chrominance vector, a chrominance vector is provided to each main point in response to all the points on the contour line. In this processing, the above-described lamellar and the vortex components are obtained, based on the chrominance vector provided in response to each main point. By utilizing this chrominance synthesis information, the chrominance vectors are provided to the points on the above contour line for associating between main points.

Window portion 5 utilizes the chrominance vectors on the contour line obtained by the contour line chrominance providing portion 4 to hold preliminarily a plurality of chrominances on the contour line as a different window and a requested window is opened if necessary to effect a modification of the contour line.

Contour line inner range chrominance processing portion 6 provides the chrominance vectors everywhere within the contour line, based on the chrominance vectors on the contour line obtained in the contour line chrominance providing portion 4. In this processing, for example, since the chrominance synthesis information is provided, as above, regarding both the left and light points in the contour line along a horizontal scan line, the chrominance is synthesized regarding each picture element connecting between both points and the chrominance is provided everywhere within the contour line by means for utilizing the chrominance synthesis information regarding the picture elements on an obtained horizontal line.

Monochrome determination portion 7, utilizing picture image information input thereto, effects processing of the luminance component to provide a monochrome picture in response to the luminance component.

Reference numeral 8 denotes a synthesis processing portion in which a monochrome picture from the monochrome determination portion 7 and a color picture from the contour line inner range chrominance processing portion 6 are synthesized to output thereof on a display device associated with the input portion 2.

Reference numeral 9 denotes an edge modification portion in which a chrominance vector on the contour line from the above-noted contour line chrominance provision portion 4 and a color picture from the above-noted contour line inner range chrominance processing portion 6 and so on are observed on the above display device, and if necessary, a contour line determined in the above contour line determination portion 3 is modified and processing is carried out for selecting the main points effected in the contour line chrominance provision portion 4 and modifying the determination of the chrominance vector.

The mode of operation in accordance with the present invention will be described as follows.

Based on the input picture image information, first, the contour line is determined in the contour line determination portion 3. Second, in the contour line chrominance provision portion 4, based on the chrominance vector (instruction) given to the main points on the contour line, chrominance vectors are offered to all the contour line points on the contour line (a right point and a left point adjoining each other on the contour line). In this case, the above-described chrominance synthesis information is utilized as will be described in detail hereinafter.

When the chrominance vectors on the contour line provided in the contour line chrominance provision portion 4 is regarded as preferable as requested, processing in which each chrominance vector is offered to all the picture elements within the contour line can be effected. Also in this case, the above chrominance synthesis information is utilized.

A monochrome picture provided in the monochrome determination portion 7 and a color picture provided from the contour line inner range chrominance processing portion 6 are synthesized in the synthesis processing portion 8 to be output on a display device. Further, if to be considered to be preferable, processing of the display output can be transferred by a print-out output processing procedure.

In the contour line modification portion 9, processing such as modification and so on may be implemented concerning all kinds of provided picture images in an interactive mode.

In the conventional method, when transmitting and reproducing color pictures as shown in a television picture transmission, a luminance component and a chrominance component are transmitted in response to a picture element on a color picture. For example, assuming the three primary colors, that is, Red (R), Green (G), and Blue (B) are used, the following signals such as L, I, and Q are transmitted. In the NTSC television system, for a luminance signal L, the following expression is given:

$$L = 0.2988R + 0.5868G + 0.1144B$$

For chrominance vectors I and Q, the signals I and Q are expressed as follows, respectively;

$$I = 0.736\,(R-L) - 0.286\,(B-L)$$

$$Q = 0.478\,(R-L) + 0.413\,(B-L)$$

The above-noted chrominance signals (that is, each signal on a chrominance component) I and Q are transmitted by bearing on a subcarrier. In this case, a chrominance component can be represented by a vector V, the chrominance component vector V expressed as $$V = \begin{bmatrix} I \\ Q \end{bmatrix}$$

In the above-referenced U.S. Pat. No. 4,908,698, regarding the relevant chrominance component vector V, the expression $$V = \begin{bmatrix} \xi \\ \eta \end{bmatrix}$$

is given.

If Helmholtz's formula is applied to this vector expression, the following formula is obtained.

$$V = \text{grad } L + \text{rot}\,(R \cdot K) \qquad (1)$$
$$= \begin{bmatrix} Lx \\ Ly \end{bmatrix} + \begin{bmatrix} Ry \\ -Rx \end{bmatrix}$$

where L (x, y) denotes a scalar potential such as chrominance, and R·K denotes a vector potential for which the direction is indicated by a unit vector K in the Z-axis direction, $$Li = \frac{\partial L}{\partial i}\ (i = x, y) \text{ and } Ri = \frac{\partial R}{\partial i}\ (i = x, y)$$

When an operation of div V is effected with the above-noted vector V in the expression (1) (hereinafter referred to as a divergence processing), the following is obtained.

$$\begin{aligned} \text{div } V &= \text{div} \cdot \text{grad } L + \text{div} \cdot \text{rot }(R \cdot K) \\ &= \text{div} \cdot \text{grad } L \end{aligned}$$

From this relation, the expression $$\xi x + \eta y = Lxx + Lyy \qquad (2)$$

is deduced.

When an operation of rot V is effected with the above-noted vector V in the expression (1) (hereinafter referred to as a rotation processing), the following is obtained.

$$\begin{aligned} \text{rot } V &= \text{rot} \cdot \text{grad } L + \text{rot} \cdot \text{rot }(R \cdot K) \\ &= \text{rot} \cdot \text{rot }(R \cdot K) \end{aligned}$$

From this relation, the expression $$\xi y - \eta x = Rxx + Ryy \qquad (3)$$

is deduced,
where fx, fxy, and others express the partial differential operator such as $$\frac{\partial f}{\partial x}, \frac{\partial^2 f}{\partial x \partial y},$$

and others.

Each lefthand side of the above-noted equations (2) and (3) can be measured and the respective values of the lefthand sides obtained. Thus, if the equations (2) and (3) are solved, L and R can be obtained.

When such Helmholtz's formula is applied to the chrominance component vector V, the obtained grad L and rot (R·K) are referred to as a lamellar component and a vortex component, respectively, in the present invention.

Figure 2A:
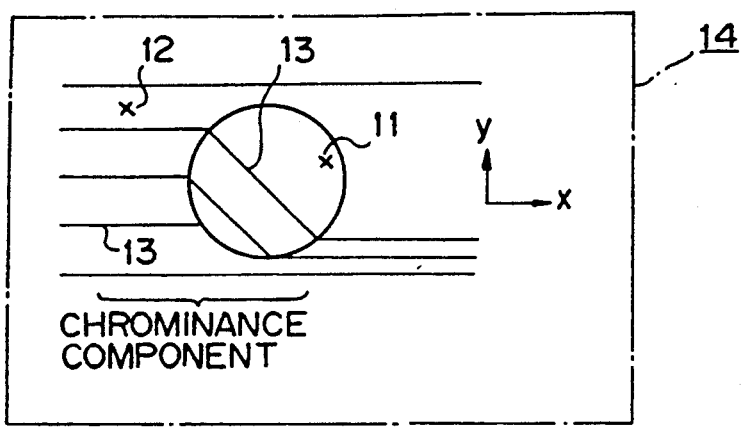
FIG. 2 illustrates a separation of chrominance component and a separation into lamellar and vortex components.
Figure 2B:
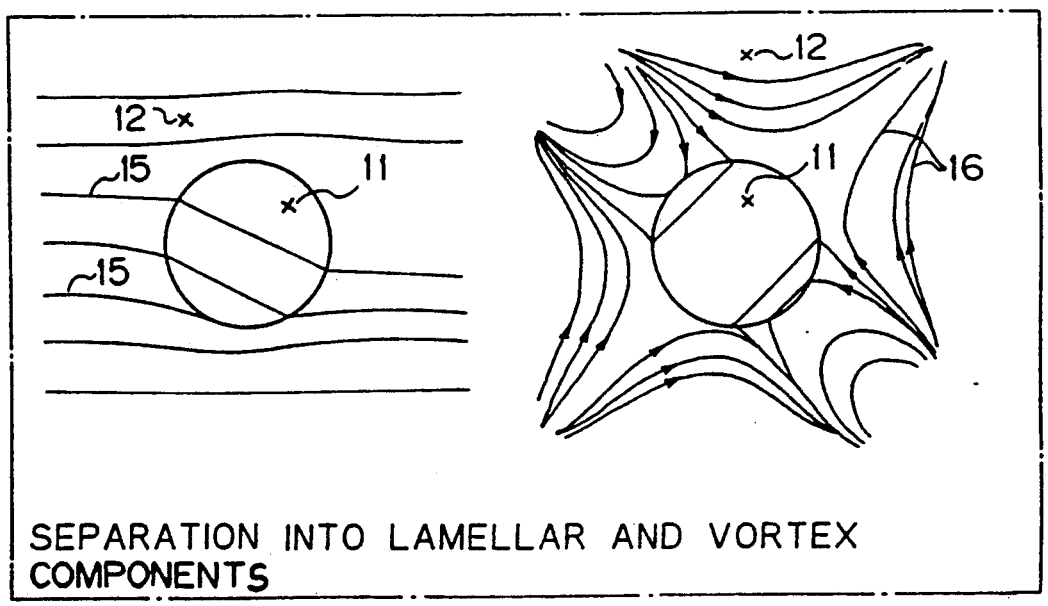

FIG. 2 illustrates separation of a chrominance component into lamellar and vortex components. In FIG. 2, reference numeral 14 denotes a given color picture in which a one-color of disk portion 11 is laid in some different colors of background portion 12. 13 denotes a vector line representing a chrominance component of such color picture. A rectilinear portion extended in a horizontal direction as shown in the figure in the vector lines 13, represents that there is provided a certain background color in the background portion 12. A rectilinear portion extended in a slant direction as shown in the figure by the vector lines 13, represents that there is provided a color different from a background color in the circular disc portion 11.

A given color picture 14 is separated into a luminance component and a chrominance component, and further, the chrominance component is decomposed into a lamellar component and a vortex component. A lamellar component 15 and a vortex component 16 which are deduced from the above-described color picture elements, are shown in the lower part of FIG. 2. As shown in the figure, the lamellar component 15 represents a laminas component and the vortex component 16 represents a vortex flow component for transmitting a vector signal having components I and Q.

Hereinafter, grad L and rot (R.K) are defined as a lamellar component and a vortex component, respectively, and further, the differentiation operations of grad L and rot (R.K) may be deemed as a derivative function of each lamellar component and each vortex component.

In order to represent the above-components as the differentiated |div V|, it is necessary for the vector signals of chrominance |div V| and |rot V| to adopt the derivative representation of each lamellar component and each vortex component.

In the above-described contour line chrominance providing portion 4 and contour line inner range chrominance processing portion 6, the above-noted lamellar component (or the derivative of the lamellar component) and vortex component are provided in response to the picture elements. The value of L and R responsive to a respective picture element is utilized to be solved according to the above expressions (2) and (3). Thus, the above-noted chrominance figure on the contour line and color picture image can be obtained.

Further, in order to obtain a much better color picture image, as will be described below with reference to FIG. 6, after the extraction of the contour line is effected, when attention is directed to the internal region of the contour, it will result that the continuity in the region of the chrominance vector leads to avoid mutual interference which is shown in FIG. 2 by the lamellar component 15 and the vortex component 16, respectively. As a result, when the processing in the above contour line chrominance providing portion 4 and contour line inner range chrominance processing portion 6 is carried out, even if only a comparatively small amount of information is processed, it is possible to synthesize a delicate color nuance.

In prior art edge detection of an edge possessed by a color picture, the edge has been searched for by solving equations of a structure line represented by the hereinafter equations. For example, from the C-line is obtained a contour line of a ridge or valley line type contour line, from the D-line, a divisional line type contour line, and from the E-line and L-line a step type contour line, respectively:

Structure lines for a scalar function $\phi$ (x, y) give primitive geometrical features satisfying a specified condition, because the structure lines are defined by the following formula and cusp points are given by cross points of two contour lines defined by X and H. In this case, the luminance information of color picture is used as a scalar function $\phi$ (x, y).

$$X(x, y) = \begin{bmatrix} \phi x \\ \phi y \end{bmatrix},$$

$$X\bot(x, y) = \begin{bmatrix} -\phi y \\ \phi x \end{bmatrix},$$

$$H(x, y) = \begin{bmatrix} \phi xx, \phi xy \\ \phi yx, \phi yy \end{bmatrix}$$

$$\begin{aligned} C(x, y) &= X^t H X\bot = 0 &: C - \text{line} \\ D(x, y) &= X^t \bot H X\bot = 0 &: D - \text{line} \\ E(x, y) &= X^t H X = 0 &: E - \text{line} \\ L(x, y) &= \text{trace } H = 0 &: L - \text{line} \end{aligned}$$

-continued where $\phi i = \dfrac{\partial \phi}{\partial i}$, $\phi ij = \dfrac{\partial^2 \phi}{\partial i \partial j}$ With respect to a vector V represented by the equation (1), divergence and rotation operation can be carried out, since a vector field $$V = \begin{bmatrix} \xi \\ \eta \end{bmatrix}$$

divided into two components, which are lamellar and vortex components.

In the above-described prior art example, in a boundary or ridge where validly different colors are collated to compare therebetween when observed by a color display and, of course, in an contour line, it is concluded that, if there is even a little difference between separate colors from the standpoint of luminance, the boundary can not be regarded as a true ridge. In order to solve this issue, in the contour line (edge determination) portion 3 as shown in FIG. 1, a changing point of the above-noted lamellar component and that of the vortex component extract a location which surpasses a predetermined threshold value, then determining a contour line which is decided by a color component and supplementing a contour line which is obtained from the above-noted luminance.

Figure 3:
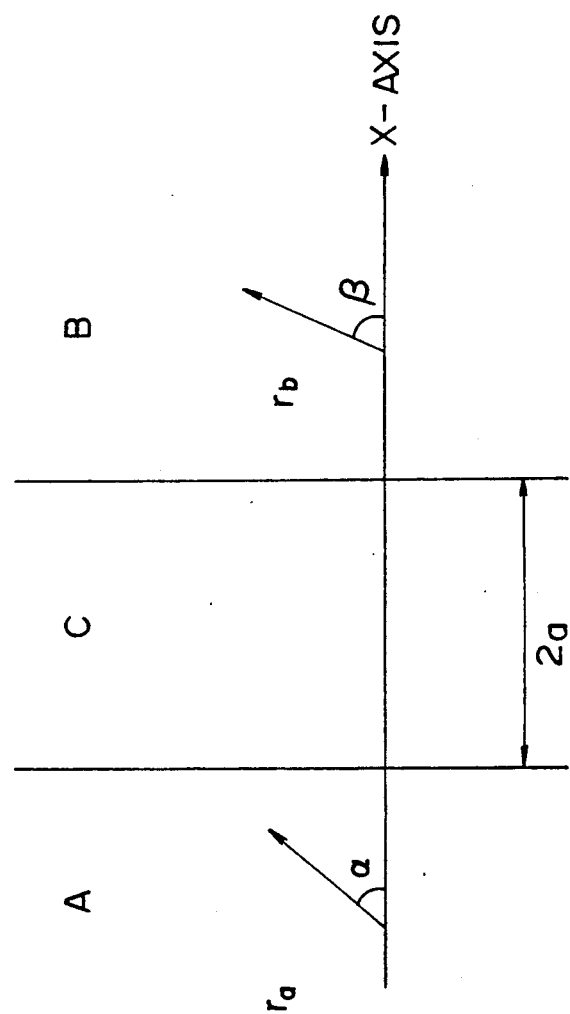
FIG. 3 is a diagram showing a step variation of the chrominance from a domain A to a domain B for the system in FIG. 1.

In connection with this point, the contour line detection system of color pictures in accordance with a system of the present invention will be described with reference to FIG. 3.

Suppose that a region A and a region B having a separate chrominance vector respectively are continuously connected therewith through a region C having a width of $2a$.

Now, assume that a chrominance vector $V_A$ in a region A and a chrominance vector $V_B$ in a region $V_B$ are given by the following formula:

$$V_A = \begin{bmatrix} ra \cos \alpha \\ ra \sin \alpha \end{bmatrix}, V_B = \begin{bmatrix} rb \cos \beta \\ rb \sin \beta \end{bmatrix}$$

Then, if div V and rot V are found in such a contour line portion, each of the following equations can be deduced from a definition of div V, $$\text{div } V = \dfrac{\partial \xi}{\partial x} + \dfrac{\partial \eta}{\partial y} = \dfrac{1}{2a} \cdot \Delta \xi$$

$$= \dfrac{1}{2a} (rb \cos \beta - ra \cos \alpha),$$

and from a definition of rot V $$\text{rot } V = \dfrac{\partial \xi}{\partial y} + \dfrac{\partial \xi}{\partial x} = \dfrac{-1}{2a} \Delta \eta$$

$$= \dfrac{1}{2a} (rb \sin \beta - ra \sin \alpha).$$

There is a tremendously significant meaning to the effect that such one part on the contour line and the remaining part other than it are considered by dividing into the two parts.

It is apparent from the above formula that $|\text{div}V|$ and $|\text{rot}V|$ show a larger value than zero in the vicinity of a contour line of a color picture, and show merely a zero value in a place other than in the vicinity of a contour line, Therefore, if a location is found where either or both of $|\text{div}V|$ and $|\text{rot}V|$ indicates a value greater than a predetermined value, it is seen that a contour line of a color picture can be extracted. As is apparent from the above-described formula (2) (which is denoted here once more)

$$\xi x + \eta y = Lxx + Lyy \qquad (2)$$

so a divergence operation (DIV) is applied to the chrominance signal V directly to find a lamellar component of $|\text{div}V|$ as a derivative value of the lamellar component 15 in FIG. 2, whereas regarding $|\text{rot}V|$, as is apparent from the above-described formula $$\xi y + \eta x = -(Rxx + Ryy) \qquad (3)$$

a rotation operation (Rot) is applied to the chrominance signal V directly to find $|\text{rot}V|$ therefrom.

As a result, it is found that, in case of the contour line extraction, when compared a divergence component output of the lamellar vector analysis element and a rotation component output of the vortex vector analysis element with a predetermined reference value set to a location in the vicinity of a zero point, the contour line of a color picture can be detected.

If the contour line detection system for finding out from the chrominance component constituted in the above way in accordance with present invention is used in combination with a prior art contour line detection system based on the luminance, a more accurate and more reliable contour line detection system for a color picture will be realized. It results from the reason why such a combination can, without omission, enable a detection of the contour line in a case where there is no significant difference of the luminance itself, but there is a conspicuous difference of the chrominance and the contour line in a case where there is no significant difference of the chrominance, but there is a conspicuous difference of the luminance.

Figure 6A:
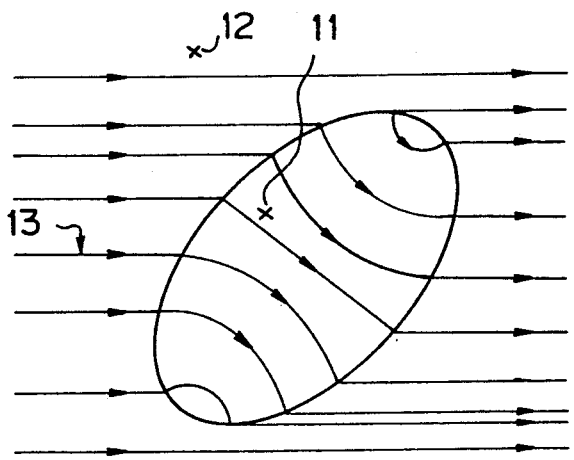
FIGS. 6A to 6C illustrate the contour line chrominance providing portion and the contour line inner range chrominance portion.
Figure 6B:
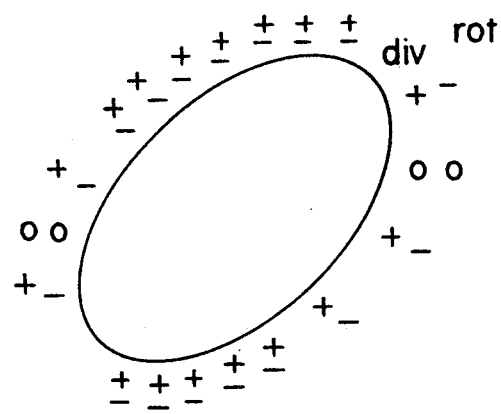
Figure 6C:
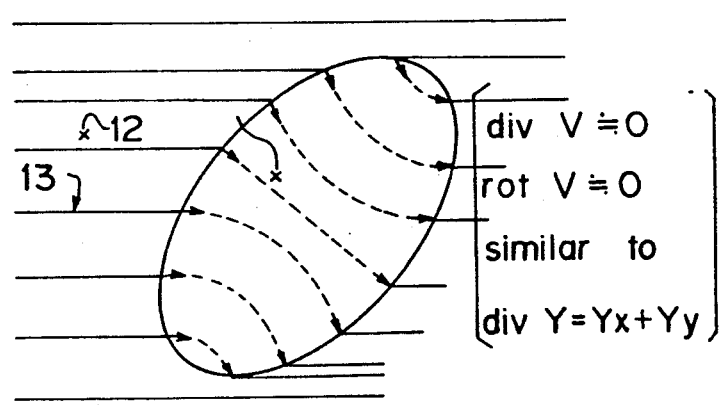

Further, in accordance with a feature of the present invention, the reason why a chrominance component is separated into a lamellar component 15 and a vortex component 16 as shown in FIG. 2 is based on the intention that, since these components cross orthogonally in a statistical way to represent the chrominance information validly, the reduction of energy possessed by the chrominance signal can lead to a compression of the transmission bandwidth. More convenient as it is, in a location where there exists a single color continually, there is a specified feature that the above-decided $|\text{div}V|$ and $|\text{rot}V|$ represent a nearly zero value. That is, since the $|\text{div}V|$ and $|\text{rot}V|$ generally represent the above zero value in a place other than in the vicinity of the contour line of a color picture, the processing in the above-described contour line chrominance providing portion 4 and contour line inner range chrominance portion 6 can be dealt with more simply. The mode behavior is shown in FIGS. 6A–6C. As shown in FIG. 6A, suppose that there is a separate color ellipse in the background. By utilizing the above-mentioned means, as shown in FIG. 6B, a domain 11 and a domain 12 are separated by the contour line in response to a domain where the value of $|\text{div}V|$ and $|\text{rot}V|$ assume a zero value, thus effecting a chrominance processing separately responsive to each domain. The principle of the processing will be described hereinafter.

If a value of vector ($\xi$, $\eta$) of a chrominance component along a specified x-axis in a color picture (i.e., a lamellar component and a vortex component) is provided with, ($\xi$x, $\eta$x) can be found easily, since it is equal to a difference value of ($\xi$, $\eta$) between adjoining picture elements. Accordingly, if each value of div V and rot V is given, it is seen that ($\xi$y, $\eta$y) will be easily found in accordance with the above-noted equations (2) and (3). From this, if a difference equation of ($\xi$y, $\eta$y) is solved by taking a value of ($\xi$, $\eta$) in the specified x-axis as an initial value, the ($\xi$, $\eta$) on the x-axis adjoining to the specified x-axis can be reproduced and then by repeating the same processing method and so forth, the ($\xi$, $\eta$) all over the domain of a color picture will be able to be reproduced.

FIG. 4 is constituted by FIGS. 4A, 4B, 4C, 4D and 4E and as a whole, shows a diagram for explaining the behavior of the processing method in accordance with the present invention. In the figure, reference numeral 20 denotes a figure in which the contour line is determined. There exist different color semi-circular discs 21 and 22 in a certain color of background part 23 in the figure. In the internal part of each semi-circular disc 21 and 22, only a single color is not always reproduced, but it is shown that a saturation color is submitted such as a delicate color tint is changing based upon each location.

Figure 4A:
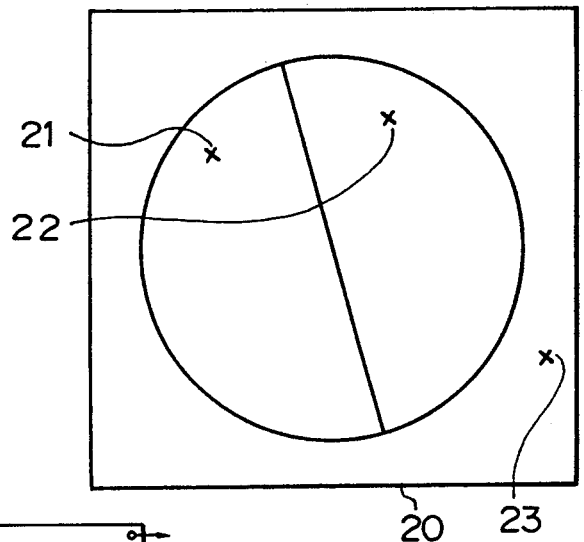
FIGS. 4A to 4E illustrate contour lines, main points, and the chrominance vectors.

Under a condition which the contour line is determined by the contour line determination unit 3 shown in FIG. 1 in the figure shape 20 as shown in FIG. 4A, the proper FIG. 20 is indicated on a display device in an input unit 2. Under these conditions, an operator refers to a known chromaticity diagram and so on with regard to main points on the contour line as shown in FIG. 4B, for example, points a, b, c, d, e, f, g, h, i, j, k, . . . , to offer each newly desired value of a chrominance vector (Arrow lines in the figure are regarded as a proper vector) FIG. 4B shows a state which the values of chrominance vector are provided to main points.

Figure 4B:
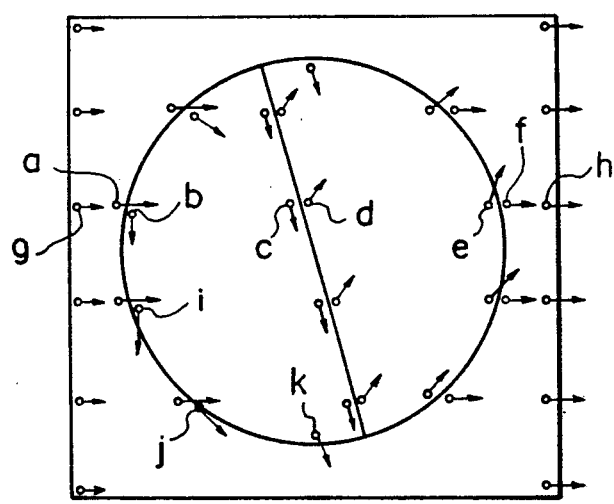
Figure 4C:
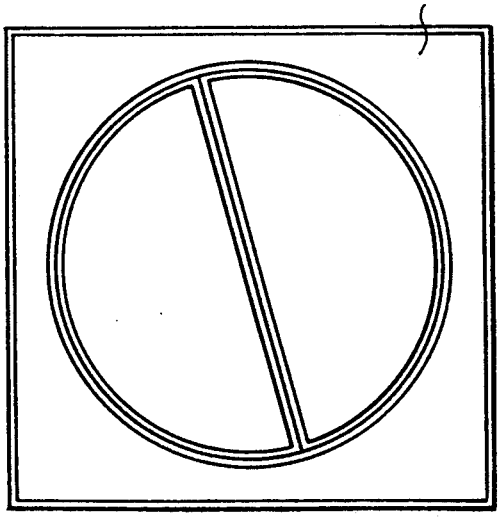

In contour line chrominance providing portion 4 as shown in FIG. 1, when a state to which a chrominance vector is provided is produced, the proper contour line chrominance providing portion 4 continuously determines each chrominance for all the picture elements along the contour line, for example, such as between points b and i, i and j, and so on as shown in FIG. 4, thus representing the figure as shown in FIG. 4C, by means of the obtained color; that is, representing a chrominance FIG. 24 on the contour line.

The processing procedure represented in FIG. 4B and FIG. 4C is effected in the contour line chrominance providing portion 4 shown in FIG. 1. As for the proper processing procedure, based on the chrominance vector value provided to the important points a, b, c, and so on as shown in FIG. 4B, the above-noted lamellar component and vortex component are utilized to effect the processing.

When the chrominance FIG. 24 on the contour line is obtained as shown in FIG. 4C and it is decided that the proper chrominance FIG. 24 is more preferable, the processing procedure is handed over the contour line inner range chrominance processing unit 6 shown in FIG. 1. In a case when the above-noted chrominance FIG. 24 is not preferable, a window portion 5 as showing FIG. 1 is utilized to find a new window FIG. 25 as shown in FIG. 4E. That is, a modification processing is effected by a contour line modification portion 9. These modification results are devised to be held if need be as a new window FIG. 25, respectively.

Figure 4D:
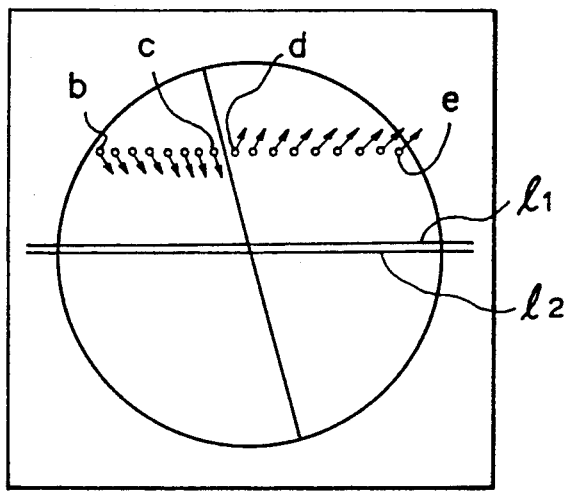
Figure 4E:
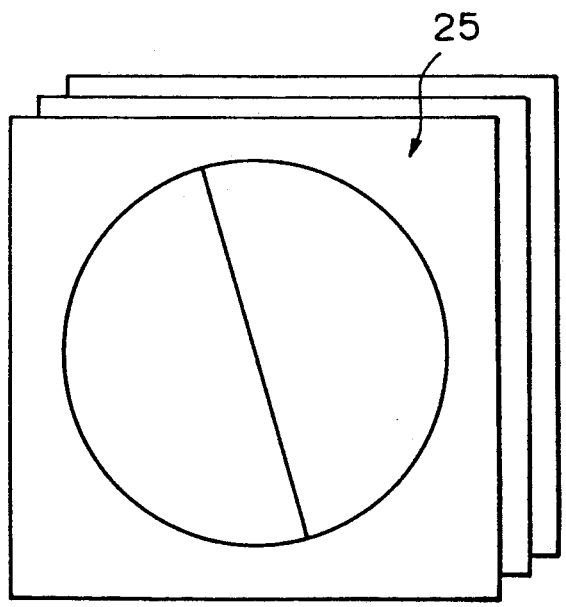

In the contour line inner range chrominance provision portion shown in FIG. 1, as is the case with the above-noted processing procedure in which the lamellar component and vortex component are utilized as shown in FIG. 4D, the chrominance is provided for the picture elements between the points b and c. For example, the chrominance is provided in such a way that the chrominance provided on a scan line $l_1$ will be expanded on the following scan line $l_2$.

Figure 5B:
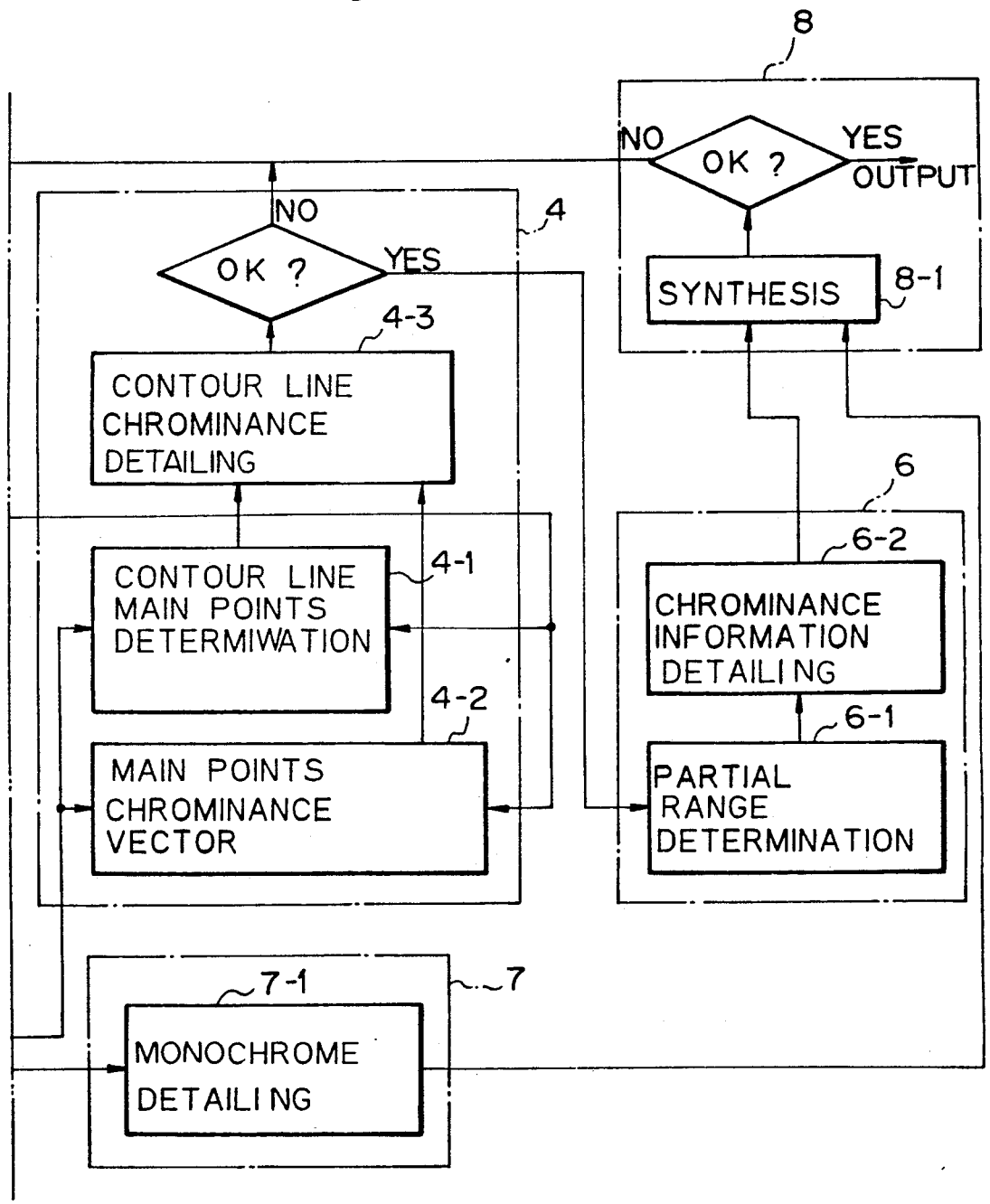

FIG. 5 is a block diagram showing an embodiment in accordance with the present invention. Reference numerals 2, 3, 4, 5, 6, 7, 8 and 9 in FIG. 5 corresponds to those in FIG. 1.

After explaining the constituents in FIG. 5, detailed description on the function thereof will be carried out hereinafter.

The contour line determination portion 3 includes (i) a monochrome information extraction portion (3-1) for extracting monochrome information from a given picture.

(ii) A contour line extraction portion (3-2) for extracting contour lines by utilizing the chrominance component of a given picture.

(iii) A main contour line formation portion (3-3) for producing a main contour line from a given design.

(iv) A contour line definition portion (3-4) for determining the contour line of a figure by connecting a break and so on in the contour line.

Regarding the above (i) to (iv) constituents, the monochrome information extraction portion 13 extracts the above-noted C-line, D-line, E-line and L-line. The contour line extraction portion (3-2) extracts a location in which either of the above-noted |divV| or |rotV| shows larger value with respect to a color component of a given picture as explained reference to FIG. 3. The main contour line formation portion 3-3 produces a main contour line, by, for example, a raster scan, regarding a given sketch drawing. The contour line definition portion (3-4) determines the contour line by making up for a break of the contour line. Further a contour line can be modified as desired in a form corresponding to the contour line modification portion 9.

The contour line chrominance providing portion 4 includes:

a contour line main points determinations unit (4-1) for providing main points on the contour line in a form such as a point a, b, c and so on as shown in FIG. 4B.

a main points chrominance vector determination unit (4-2) for determining as chrominance vector as shown in FIG. 4B, for the above main points a, b, c and so on; and a contour line chrominance detailing unit (4-3) for obtaining a chrominance FIG. 24 as shown in FIG. 4C;

The window portion 5 includes a new window holding unit (5-1) for holding a new window FIG. 25 as shown in FIG. 4E.

The contour line inner range chrominance processing portion 6 includes;

a partial range determination unit (6-1) for determining partial range in a form such that adjoining scan lines, for example, l, and l2 are determined as shown in FIG. 4D; and a chrominance vector information detailing unit (6-2) for providing a chrominance in response to each picture element for the proper each partial range.

The monochrome determination portion 7 includes a monochrome detailing unit (7-1) for extraction in a finely segmented way a monochrome picture responsive to a luminance component, form a contour line obtained by the contour line definition unit (3-4) and a monochrome information obtained by the monochrome information extraction unit (3-1).

The synthesis processing portion 8 includes a synthesizing unit for synthesizing a figure obtained by the contour line inner range chrominance processing unit 6 and a figure obtained by the monochrome determination portion 7.

The contour line modification portion 9 includes a contour line modification unit (9-1) for giving instructions for a modification of a contour line, a need to be newly established, an elimination and so forth on a display device, when a whole contour line obtained at that time is not always preferable.

If both or either of a figure obtained in the contour line chrominance providing portion 4 and/or a figure obtained in the synthesis processing portion 8, do not fulfill the sufficient requirements, a window is opened at the window portion J and as for the figure in the proper opened window, a check is effected whether the contour line itself is preferable or not. If it is not preferable, the processing procedure is transferred to that of the above contour line modification portion 9.

If it is preferable, another amending processing procedure in the contour line chrominance providing portion 4 is effected, for example, a processing procedure which main points are done over again on the contour line or the determination of a chrominance vector is done over again.

The function of the color picture image processing system in accordance with the present invention will be described in detail with reference to FIGS. 7 to 10.

Figure 7:
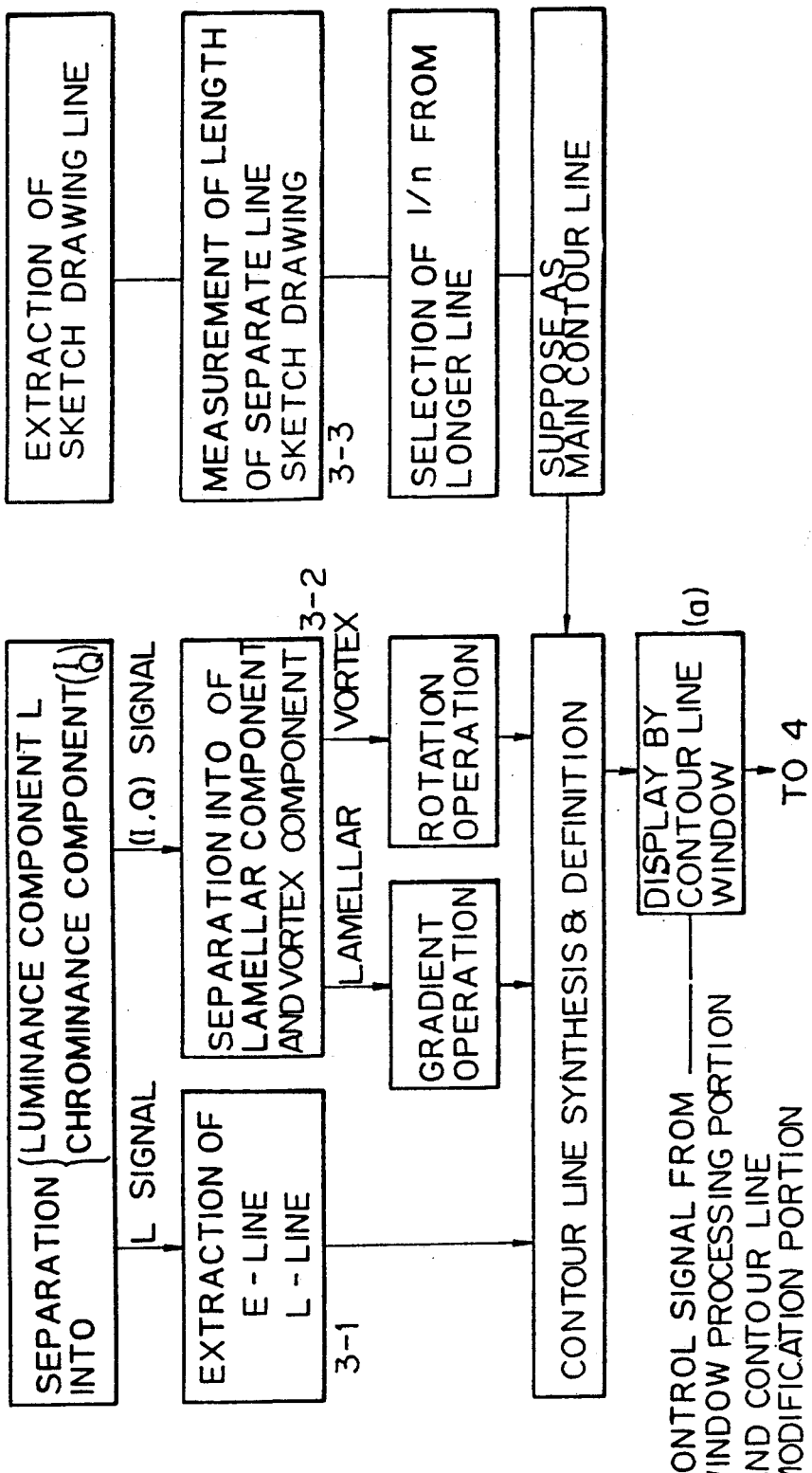
FIG. 7 is a flow chart showing the function of the contour line determination portion.

FIG. 7 denotes a flow chart of the function of an input portion 2 and a contour line determination portion 3.

In the input portion 2, a picture information and a sketch drawing information are delivered to the contour line determination portion 3.

When transmitting and reproducing color picture in a television picture transmission, a luminance component and a chrominance component are transmitted in response to a picture element on a color picture. Assuming that three primary colors, that is, R, G and B are used, signals L, I, and Q are transmitted and in particular, I and Q signals are transmitted by bearing on a sub-carrier. Accordingly, when a picture signal is input to the contour line determination portion 3, a separation into a luminance component L and a chrominance component (I, Q) is effected and from the L signal, an extraction of at least E-line and L-line is carried out. A monochrome extraction unit (3-1), extracts a monochrome information from a given picture; whereas, from I and Q signals, a separation of each signal into a lamellar component and a vortex component is effected and then a grad operation of the lamellar component and a rot operation of the vortex component is effected to extract a contour line by the contour line extraction unit (3-2). Then, the outputs of the monochrome extraction unit (3-1) and the contour line extraction unit (3-2) can implement a contour line synthesis and provide a definition.

When a sketch drawing information is input to the contour line determination portion 3, a line figure of a sketch drawing is extracted and then a length of each separate line figure in a sketch drawing is measured to select 1/n from among a longer line figure to estimate a main contour line. The result of the estimation of the main contour line is also delivered to the contour line synthesis and the definition function portion.

The output of the contour line synthesis and definition function portion is controlled by the outputs of the window portion 5 and the contour line modification portion 9 to effect a contour line window display to deliver signals to the contour line chrominance providing portion 4. Here, he contour line window display is regarded as one of the functions of the window portion 5, viz., 5 (a) (as will be described hereinafter).

Figure 8B:
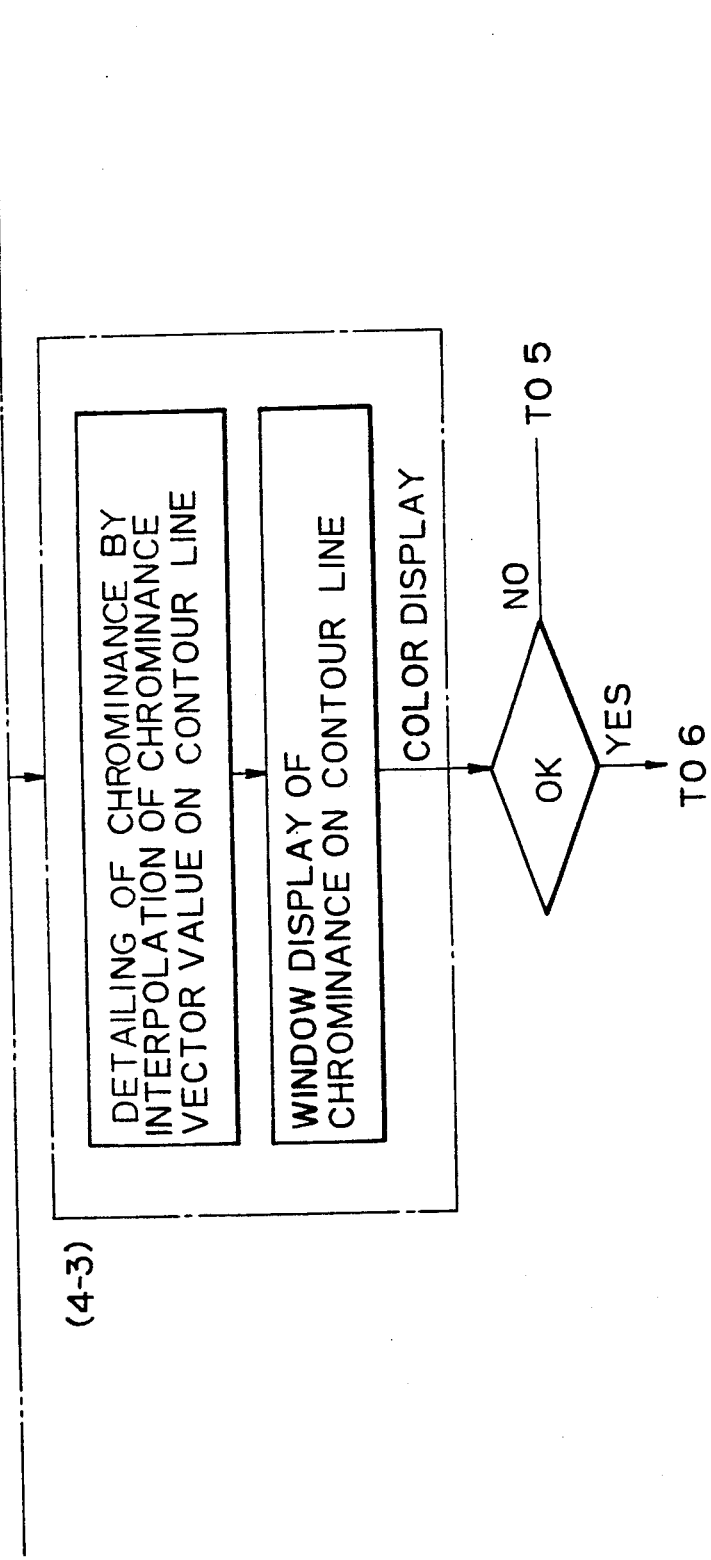

FIG. 8 denotes a flow chart of the function of the contour line chrominance providing portion 5.

A signal of the contour line determination portion 3 is delivered to the contour line chrominance providing portion 4 and sampling points are extracted on the contour line. When a picture signal is input and the chrominance vector is extracted in a chrominance vector extraction unit (4-2) to determine the chrominance on main points.

The chrominance determination on main points is effected also through a procedure of determining as main points on the contour line after the above procedure of sampling points extraction on the contour line. Further, in the above procedure of "determining as main points on the contour line" on the contour line window (4-1), when a sketch drawing information is input, after a main points window display is effected, a procedure of "a chrominance vector selection on a hue diagram" is done and then the procedure of chrominance determination on main points is also effected.

The above-noted procedure of chrominance determination on main points is displayed through a color display and then the output of the contour line main points determination unit (4-1) is delivered to a contour line chrominance detailing unit (4-3) where a chrominance detailing by an interpolation of a chrominance vector value on the contour line is effected and then a procedure of a contour line chrominance window display is effected and then through a color display, if the procedure of a contour line chrominance window display is OK, an output signal is delivered to a contour line inner range chrominance processing portion 6, whereas if the procedure is not OK, an output signal is delivered to a window portion 5.

In the above case, the operation of the unit (4-1) corresponds to the function (5b) of the window portion 5, whereas the operation of the unit (4-3) corresponds to the function (5c).

Figure 9:
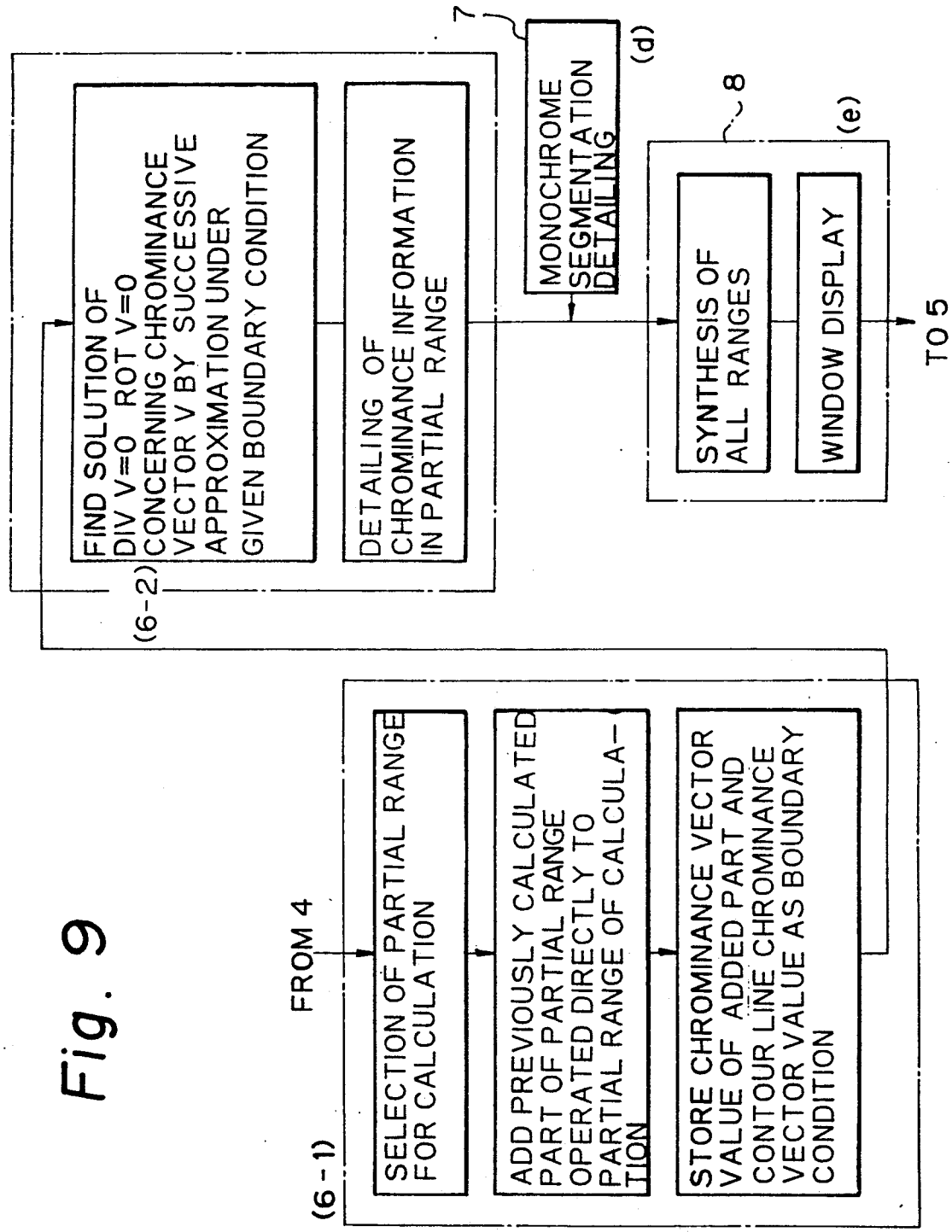
FIG. 9 is a flow chart showing the function of the contour line inside range chrominance provision portion.

FIG. 9 denotes a flow chart of the function of the contour line inner range chrominance processing portion 6. A feature of the processing portion 6 is in that an chrominance vector can operate using the values of a part of a partial domain adjoining to a partial domain to be operated, in order that the chrominance vector may maintain continuity between adjoining picture images and reduce a noise.

A signal from the contour line chrominance providing portion 4 is delivered to a partial domain determination unit (6-1), where a segmentation of a partial domain to be operated is effected and then a part of partial domain to be operated immediately before is added to an operation partial domain and further, the value of a chrominance vector in an additional part and the value of contour line chrominance vector are stored as data for a boundary condition. The output of the stored data is delivered to a chrominance information detailing unit (6-2), where a first procedure that a solutions of div V=0, and rot V=0 concerning a chrominance vector V can be worked out by a successive approximation method under a given boundary condition is effected and then a second procedure that a detailing of the chrominance information is effected in a partial domain. Thus, the output of the chrominance information detailing is delivered to a synthesis processing portion 8 through a signal from a monochrome information detailing portion 7.

In the synthesis processing portion 8, a first procedure of synthesizing all the domains and a second processing of a window display are implemented and then the output of the synthesis processing portion 8 is delivered to a window portion 5.

Figure 10:
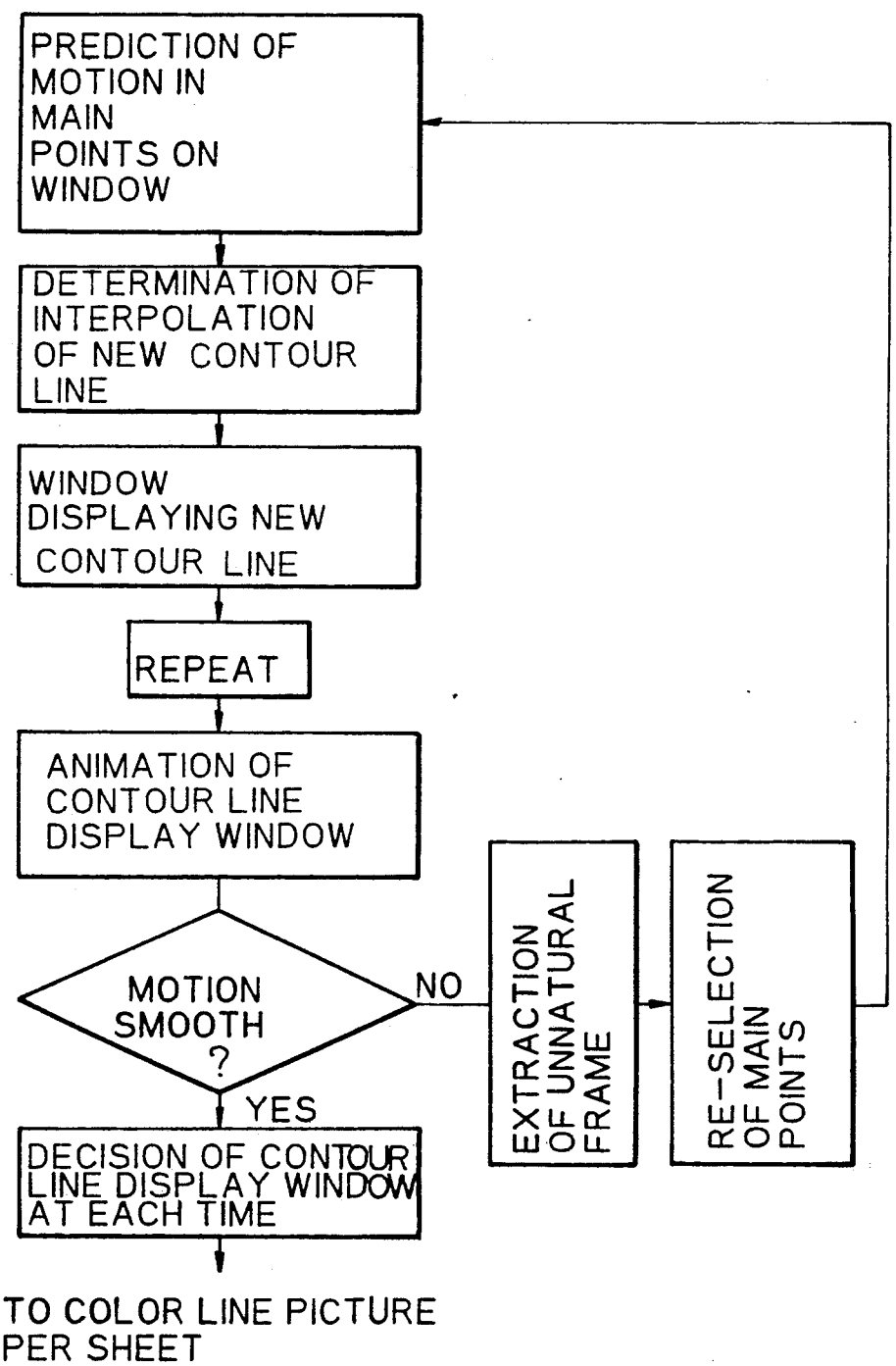
FIG. 10 is a flow chart showing the function of the window portion.

FIG. 10 denotes a flow chart of the function of the window portion 5. A feature of the window portion 5 is that there exist five functions (a) to (e).

(a) a contour line display window (b) a chrominance vector display window at main points on a contour line. (Vectors are selected by a hue window.)

(c) a contour line detailing hue display by a contour line chrominance window. (A concrete color hue is displayed in association with a contour line portion.)

(d) a monochrome screen display window by means of a luminance component.

(e) a color picture unification display window

As described above, in the window portion 5, both a hue window for filling the role of a palette in order that a picture image may draw a color pointing and five windows (a) to (e) are utilized.

The windows (a) to (e) correspond to a compass and the steps for using point and a paintbrush to make a picture on a compass are visible as steps for making pictures with color by means of a multi-window and it is easy for an operator of the system to return to the contour line modification portion 9 and the contour line chrominance providing portion 4 by the window portion 5.

Moreover, the window portion 5 can be worked to interpolate by providing only a change every frame of the contour line main points in order to make a picture of a more natural color animation.

FIG. 10 show a flow chart of an application of a modification routine to an animation.

The motion of main points on the window by the function (5b) is predicted, an interpolation of a new contour line is determined, a new contour line is displayed on the window (5a), and the repetition is done. Then, an animation of the contour line display window (5a) is obtained, and if the motion is smoothing, the contour line display window (5a) at each time is decided and each color line picture per sheet is obtained. If the motion is not smoothing, an unnatural frame is extracted, a selection of main points is done over again return to the original procedure of a prediction of motion in main points on the window (5b).

An animation processing means by means of the contour line chrominance providing routine checks a smoothing characteristic of coloring on the contour line as the above figure by using an animation display of the window (5c).

As is the same, using the window (5d) an animation display of a luminance component is synthesized successively concerning a color picture unification display window (5e) to check it as an animation. If an unnatural motion portion occurs, a modification is effected by returning to the contour line modification portion 9 or the contour line chrominance providing portion 4 and a very natural color animation is synthesized successively by the system of the present invention.

As described above, the system in accordance with the present invention utilizes a multi-window method and a vector characteristic effectively, so a vast application is obtained and it is useful for a painting box in a high-definition television system (HDTV).

We claim:

1. A color picture image processing system for effecting hue processing and hue modification based on a chrominance component of picture information, said system comprising;

input means for inputting and outputting picture information;

contour line determination means for determining a contour line in response to the picture information from said input means;

contour line chrominance providing means for determining, from the contour line determined by said contour line determination means, a plurality of main points on the contour line, and newly determining a chrominance main point vector to each of the main points and newly providing chrominance contour vectors to an entirety of the contour line, based on values of the chrominance main point vectors;

modification of the contour line determined by said contour line determination means, based on the chrominance contour vectors of the contour line obtained by said contour line chrominance providing means; and contour line inner range chrominance means for newly providing chrominance inner vectors inside a range defined by the contour line, based on the chrominance vectors of the contour line provided by said contour line chrominance providing means.

2. A system according to claim 1, wherein said contour line determination means determines the contour line in response to the picture information and sketch drawing information.

3. A system according to claim 2, wherein, when a picture signal is supplied to said contour line determination means as the picture information, said contour line determination means derives a luminance component part and a chrominance component part from the picture signal and extracts E-line data and L-line data as monochrome information from the luminance component part.

4. A system according to claim 3, wherein, when the picture signal is supplied to said contour line determination means as the picture information, said contour line determination means derives a lamellar component part and a vortex component part from the chrominance component part, and carries out a gradient calculation on the lamellar component part and a rotation calculation on the vortex component part.

5. A system according to claim 1, wherein said contour line determination means receives sketch information from said input means and extracts a line picture of a sketch drawing therefrom.

6. A system according to claim 3, further comprising synthesis means for processing at least the monochrome information, the chrominance contour vectors and the chrominance inner vectors to constitute an instructed color picture.

7. A system according to claim 1, further comprising: window means for holding a resultant window setting from modification processing by said contour line modification means.

8. A system according to claim 7, wherein said window means enables said contour line modification means to supply instructions for a modification of the contour line.

9. A system according to claim 1, wherein said contour line determination means determines the contour line in response to sketch drawing information and in response to the picture information from said input means.

10. A method of hue processing in a hue processor, said method comprising the steps of:
 (a) receiving picture information;
 (b) determining a contour line based on the picture information received in step (a);
 (c) determining main points of the contour line determined in step (b);
 (d) determining chrominance main point vectors to each main point determined in step (c);
 (e) providing chrominance contour vectors to an entirety of the contour line determined in step (b) by interpolation based on the chrominance main point vectors determined in step (d);
 (f) providing chrominance inner vectors inside the contour line based on one of the chrominance main point vectors and the chrominance contour vectors.

11. A method according to claim 10, further comprising the steps of:
 (g) storing a plurality of chrominance contour vectors within a window; and
 (h) displaying instructions to a user for modification of the contour line.

12. A method according to claim 10, wherein said determining of the main points in step (c) determines the main points based on a contour line newly identified by a user.

13. A method according to claim 10, wherein said determining of the main points in step (c) comprises the steps of:
 (c1) storing a plurality of the chrominance contour vectors;
 (c2) displaying instructions to a user for modification of the chrominance contour vectors; and
 (c3) receiving main points representing a modified contour line.

14. A method according to claim 10, wherein said receiving in step (a) includes receiving a video signal comprising luminance and chrominance parts.

15. A method according to claim 14, further comprising the steps of
 (g) performing a gradient operation on a lamellar component of the chrominance part received in step (a); and
 (h) performing a rotation operation on a vortex component of the chrominance part received in step (a).

16. A method according to claim 14, further comprising the step of (g) synthesizing a color picture from at least the luminance part received in step (a), the chrominance contour vectors provided in step (e) and the chrominance inner vectors provided in step (f).

* * * * *

UNITED STATES PATENT AND TRADEMARK OFFICE
CERTIFICATE OF CORRECTION

PATENT NO. : 5,126,834

DATED : June 30, 1992

INVENTOR(S) : Hajime ENOMOTO et al.

It is certified that error appears in the above-identified patent and that said Letters Patent is hereby corrected as shown below:

On the title page, in block [56], under "References Cited-U.S. Patent Dcouments" insert the follow:

--4,141,034   2/1979   Netravali     358/13
4,500,919    2/1985   Schreiber     358/78
4,816,901    3/1989   Music et al.  358/13
2,920,131    1/1960   Valensi       358/13
3,860,953    1/1975   Cutler et al. 358/13
4,908,698    3/1990   Enomoto et al. 358/13--

Under "References Cited-Foreign Patent Documents" insert the following:

--63-299594   12/1988   Japanese Patent Office
1-213761      3/1989    Japanese Patent Office
63-246088     10/1988   Japanese Patent Office
1-140883      6/1989    Japanese Patent Office
63-197186     8/1988    Japanese Patent Office
863,604       3/1961    European Patent Office
60-213190     10/1985   Japanese Patent Office--

In block [57], in line 19 of the Abstract, "this" should be --is thus--.

UNITED STATES PATENT AND TRADEMARK OFFICE
CERTIFICATE OF CORRECTION

PATENT NO. : 5,126,834

DATED : June 30, 1992

INVENTOR(S) : Hajime ENOMOTO et al.

It is certified that error appears in the above-identified patent and that said Letters Patent is hereby corrected as shown below:

Col. 4, line 3, delete the second occurrence of "to";
line 4, delete the first occurrence of "be" and delete "to be".

Col. 7, line 13, before "divided" insert --is--.

Col. 10, line 67, after "chrominance" insert --vector--.

Signed and Sealed this

First Day of March, 1994

Attest:

BRUCE LEHMAN

Attesting Officer

Commissioner of Patents and Trademarks